Jan. 12, 1943.  C. E. STRECKER ET AL  2,308,399
SWING GATE VALVE
Filed July 10, 1941  2 Sheets-Sheet 1
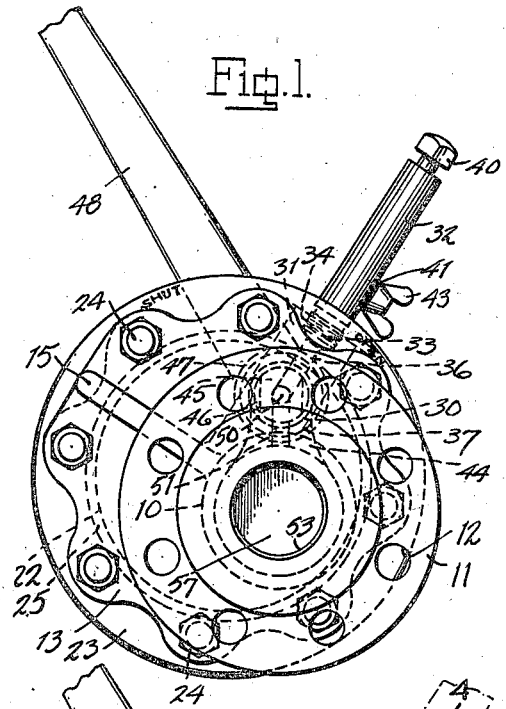
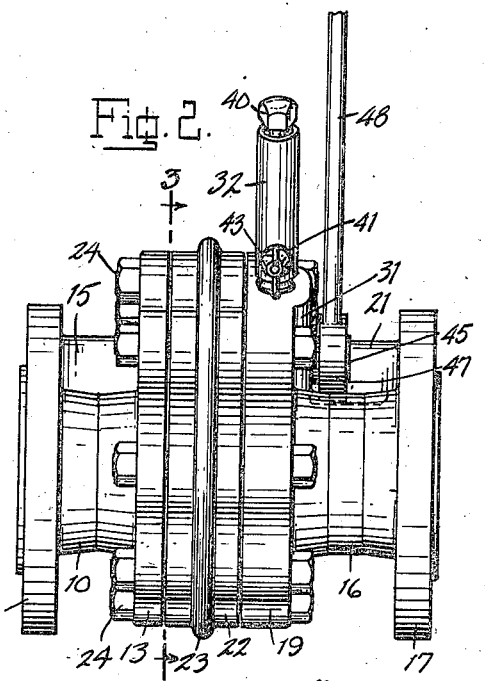
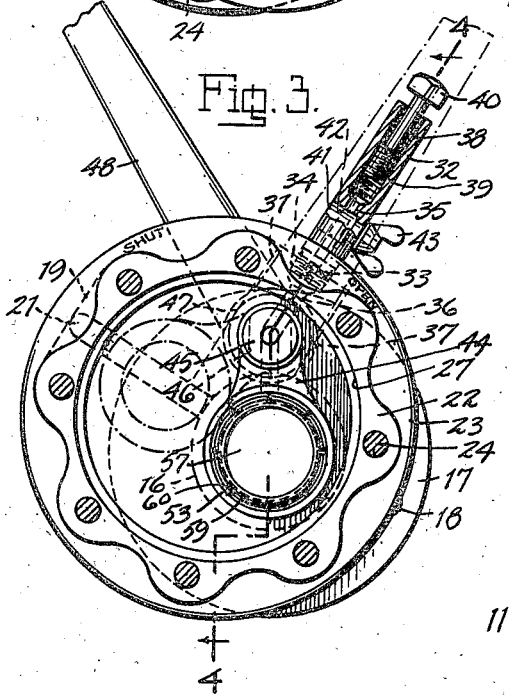
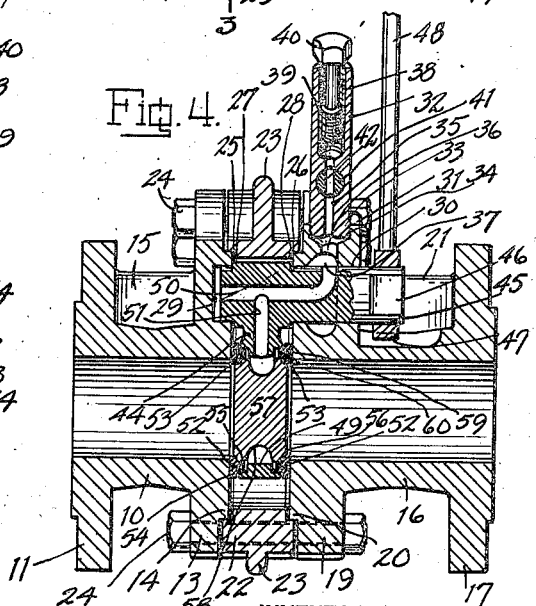
INVENTORS
CHARLES E. STRECKER AND
CHARLES J. KOPRIVA.
BY
ATTORNEY Jan. 12, 1943.　　C. E. STRECKER ET AL　　2,308,399
SWING GATE VALVE
Filed July 10, 1941　　2 Sheets-Sheet 2
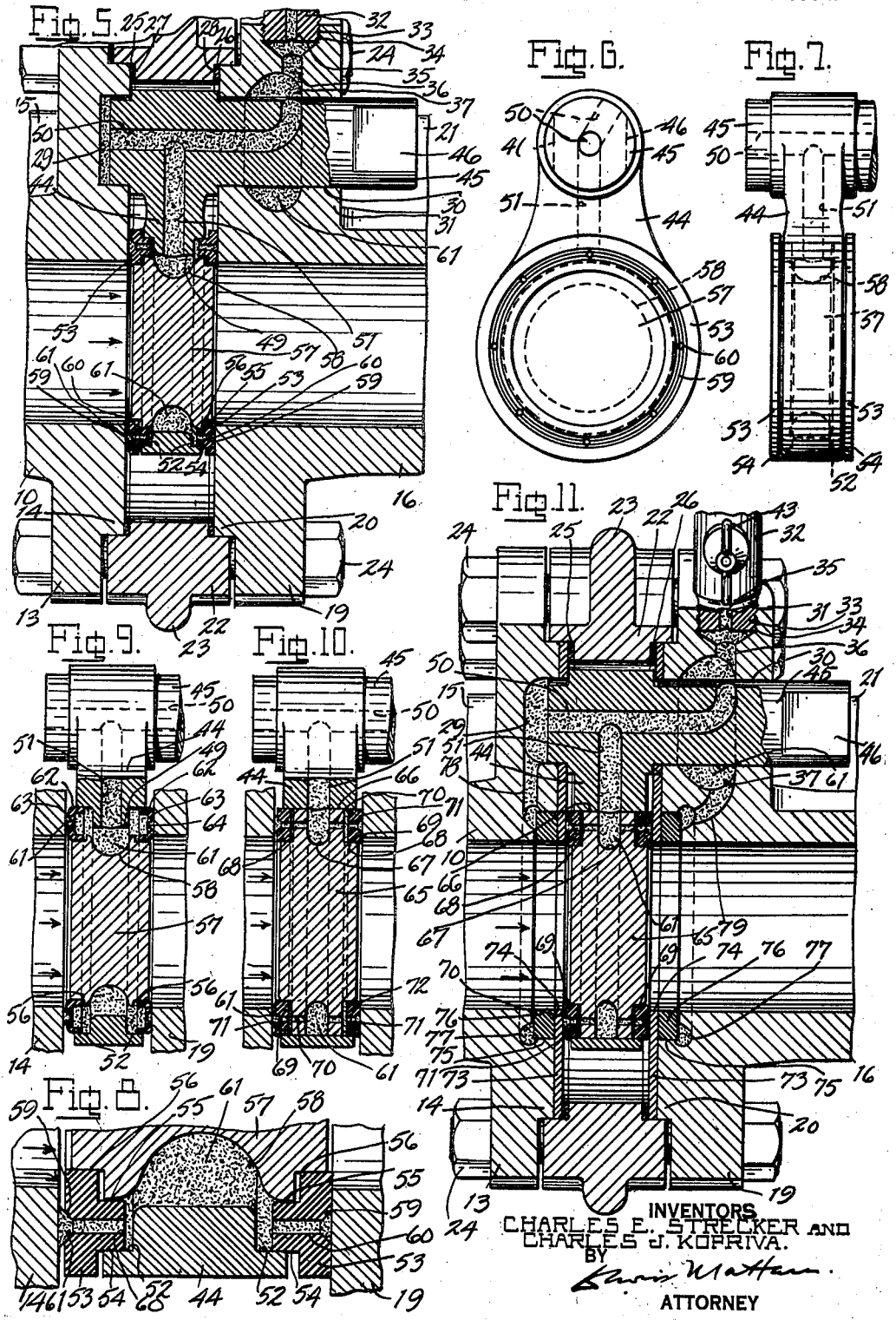
INVENTORS
CHARLES E. STRECKER AND
CHARLES J. KOPRIVA.
BY
ATTORNEY Patented Jan. 12, 1943

2,308,399

UNITED STATES PATENT OFFICE 2,308,399

SWING GATE VALVE

Charles E. Strecker, Arlington, and Charles J. Kopriva, Bloomfield, N. J., assignors to Encor Corporation, Belleville, N. J., a corporation of New Jersey Application July 10, 1941, Serial No. 401,734

5 Claims. (Cl. 251—18)

The present invention relates to a swing gate valve, especially intended for use with gaseous or liquid fluids which require a leak-proof seal under such conditions as high pressure, high temperature, volatility, and the like.

It is an object of the invention to provide a swing gate valve, having relatively movable sealing rings at each side of the valve gate for seating upon the valve seats surrounding the conduit at each side of the gate, and to provide pressure means in the form of a sealing and lubricating heavy plastic packing material acting upon the sealing rings, such plastic material being forced between the rings and the seating surfaces for establishing a seal and constituting a lubricant to enable the valve gate to be operated to opened or closed position with facility.

It is a further object to provide a valve gate, having relatively movable sealing rings, and in which spring means for exerting expansive pressure upon these rings is dispensed with, the expansion of the rings being accomplished by the use of plastic material under pressure between the rings.

A further object is to provide a valve structure which will mould the plastic material constituting the seal into a tapered cross-sectional shape diverging outwardly toward the seating surfaces, so that the inclined surface of the plastic material exposed to the pressure of the fluid within the conduit of the valve will be acted upon by the pressure substantially at right angles to the inclined surface. Thus, instead of causing the sealing material to be displaced by the pressure to break the seal, the pressure forces the inclined surfaced fin-like section of the seal against the seating surface. This action is somewhat similar to the well-known hat packing used in connection with pistons, and wherein the margin of the hat packing opposes a tapered fin-like surface to the pressure, the force of the pressure acting as a wedge between the inclined surfaced margin of the packing and the piston to force the packing tightly against the cylinder wall.

The material employed for hat packing is usually leather or an impregnated fabric, whereas in the present invention it is proposed to employ a heavy plastic material which may be forced into place through pressure, and may be renewed when desired simply by adding more plastic and forcing this under pressure to the valve seat, the consistency of the material being such that it provides a tough and tenacious fin-like sealing structure which will not deteriorate under the effect of the fluid passing through the valve. While such material may be of any suitable type to produce the desired results, it is particularly proposed to provide a material formed from a combination of vegetable or animal substances and mineral substances, as for instance castor oil, paraffine, coal tar, or the like, constituting the animal and vegetable ingredients, and graphite, mica, asbestos, or the like, constituting the mineral ingredients. In practice these will be proportioned depending upon the particular requirements, the plastic material for a valve to be used in connection with a fluid at very high temperatures having an increased amount of mineral ingredients, while material for use with cold fluids, either liquid or gaseous, may have an increased amount of animal and vegetable ingredients. This material may be provided in stick form so that it may be conveniently inserted in the pressure-gun of the valve.

It is a further object to provide means in relation to the stem of the valve gate for receiving the plastic material to constitute a seal and lubricant means for the stem, such means being in communication with the means for supplying the plastic to the valve seats.

With the above and other objects in view embodiments of the invention are shown in the accompanying drawings, and these embodiments will be hereinafter more fully described with reference thereto, and the invention will be finally pointed out in the claims.

In the drawings:

Fig. 1 is an end view of a swing gate valve, according to an exemplary embodiment of the invention, the swing gate being shown in closed position.

Fig. 2 is a side elevation.

Fig. 3 is a transverse sectional view, taken along the line 3—3 of Fig. 2, and showing the swing gate chamber of the valve, the full lines showing the swing gate in closed position and the dot-and-dash lines showing it in opened position.

Fig. 4 is a vertical longitudinal sectional view, taken along the offset and inclined line 4—4 of Fig. 3.

Fig. 5 is a fragmentary sectional view, similar to Fig. 4, and on an enlarged scale.

Fig. 6 is a front elevation of the valve gate in detached relation.

Fig. 7 is a side elevation thereof.

Fig. 8 is a fragmentary view substantially enlarged, and showing in detail the manner in which the plastic material seats against the valve seats to form a plastic seal.

Fig. 9 is a fragmentary sectional view of a modified form of swing gate, according to the invention, fragmentary portions of the valve seats being shown in relation thereto.

Fig. 10 is a fragmentary sectional view of another modified form of swing gate, according to the invention, fragmentary portions of the valve seats being shown in relation thereto.

Fig. 11 is a view similar to Fig. 5 of a still further modified form of the invention, in which the valve seats consist of plate members having plastic sealing means arranged at each side thereof, the plastic sealing means at one side being carried by the swing gate and the plastic sealing means at the other side being mounted in the valve body.

Similar reference characters indicate corresponding parts throughout the several figures in the drawings.

Referring to the drawings, the swing gate valve, according to the exemplary embodiment of the invention shown in Figs. 1 to 7, inclusive, comprises a valve body consisting of a tubular conduit member 10 at one side, having a circular pipe-fastening flange 11 at its outer end provided with bolt holes 12 for securing an adjacent section of pipe thereto, and provided at its inner end with a wall flange 13, having a scalloped periphery, and provided upon its inner face with a circular raised valve seat 14, having its center eccentric to the center of the conduit 10 to provide a sufficient space at one side of the conduit to receive the valve gate in its open position, the valve gate in its closed position being centered upon the conduit. A radial reinforcing rib 15 is provided along the conduit member 10 between the flanges 11 and 13. A substantially similar tubular conduit member 16 forms the other side of the valve body and is provided at its outer end with a circular pipe-fastening flange 17, having bolt holes 18 for securing an adjacent length of pipe thereto, and provided at its inner end with a wall flange 19, having a scalloped periphery, and having a circular raised valve seat 20, similar to the seat 14 of the conduit member 10. A radial reinforcing rib 21 is provided along the conduit member 16 between the flanges 17 and 19.

Between the two conduit members 10 and 16 there is provided a circular center piece in the form of a ring 22, cylindrical at its inner periphery and scalloped at its outer periphery, to conform to the outer peripheries of the conduit members, and having a projecting circular reinforcing rib 23 disposed centrally. The wall flanges 13 and 19 of the two conduit members and the center piece 22 are provided with aligned bolt holes, and the three parts of the valve body are secured together by bolts 24 engaged through these holes. Suitable packing rings 25 and 26 are disposed in annular recesses 27 and 28 at the respective sides of the inner peripheries of the center piece 22 and these packing rings are compacted into sealed relation by tightening of the bolts.

The wall flange 13 of the conduit member 10 is provided in vertically aligned position above the conduit with a bearing recess 29 for the valve stem and the wall flange 19 of the conduit member 16 is provided in axial alignment with this recess with a cylindrical valve stem bearing passage 30. The wall flange 19 is provided with an enlargement 31 extending to its periphery and disposed radially of the valve stem passage 30 and which provides a mounting for the plastic material pressure gun element 32, the threaded end 33 of which is screwed into a threaded opening 34 in said enlargement. The passage 35 of the pressure gun is in communication through a radial passage 36 in the enlargement with an annular plastic receiving space 37 surrounding the bearing passage 30 and adapted, as will presently more fully appear, to provide a plastic seal for the valve stem. The pressure gun is provided at its outer end with an enlarged threaded reservoir 38 for receiving plastic material, and a pressure screw 39 is engaged therein, having a nut head 40 at its outer end for turning the pressure screw by means of a suitable wrench. Within the passage 35 there is provided a transverse stop-cock 41 which in its open position has its passage 42 aligned with the passage 35 and in its closed position closes the passage 35. The stop-cock is provided with a wing-nut operating handle 43.

The sealing ring holder member 44 of the valve gate has its stem 45 rotatably engaged in the bearing passage 30 and the bearing recess 29, the outer end of the stem projecting beyond the passage 30 where it is provided with flats 46 for engagement by the hub 47 of the wrench 48. The sealing ring holder member, which is disposed in the circular cylindrical valve gate chamber formed by the two conduit members and the center piece, is of circular form at its depending portion below the stem and is provided with a circular opening 49 for receiving the valve sealing rings. The valve stem 45 is provided with an axial passage 50 extending from its inner end to an intermediate point where it is extended at an angle to the surface of the valve stem at a point in register with the annular space 37, and this passage 50 is connected by a passage 51 to the circular ring-receiving opening 49, thus providing a passage for plastic from the pressure gun around the circular passage 37 through the passages 50 and 51 to the ring-receiving opening for the purpose of supplying plastic between the rings and to the valve seats, as will hereinafter more fully appear. The recess 29 is spaced from the inner end of the valve stem to provide a plastic-receiving sealing space at the inner end of the stem, and which in connection with the seal provided by the sealing space 37 effectually seals the interior of the valve against leakage around the valve stem.

At each side of the sealing ring holding member 44 there is provided an annular recess 52 surrounding the opening 49, and within each of these recesses there is slidably engaged for inward and outward movement a sealing ring member 53, having an annular recess 54 at its outer periphery adjacent its inner end and which recess engages the wall of the recess 52. A similar annular recess 55 is provided at the inner periphery of each of the ring members, and these recesses of the two ring members are engaged by the annularly recessed end portions 56—56 of a circular floating disc member 57 which constitutes a conduit closure for the valve gate. This disc member is provided with a peripheral centrally disposed channel groove 58 providing between the rings an annular space in communication with the stem passage 51 for receiving plastic material. The sealing ring members 53 are provided upon each of their seating faces with an annular groove 59 of tapered outwardly diverging cross-section, and which is in communication with the channel groove 58 through a series of spaced ports 60 drilled through the ring from the groove 59 to the inner side.

The plastic sealing and lubricating material 61 is disposed as a continuous body within the passage 35 of the pressure gun 32, the annular stem-sealing space 37, the longitudinal stem passage 50, the stem-sealing recess 29 at the end of the stem, the radial stem passage 51, the annular space provided by the groove 58, the ports 55 and the sealing ring annular grooves 59. Upon closing of the valve gate the pressure screw 39 of the pressure gun is turned to compress the plastic material and cause it to flow into engagement with the valve seats under pressure.

At the pressure side of the valve the line pressure forces the sealing ring at the opposed or zero pressure side tightly against the valve seat, while at the line pressure side the sealing ring is forced away from the seat, as indicated clearly in Figs. 5 and 8. As the pressure is applied by the pressure gun to the sealing and lubricating plastic material it is forced against the valve seat at the pressure side in the form of a tapered wedge-shape body, the marginal portions of which are tapered and fin-like and have their exposed annular surfaces each disposed at an obtuse angle to the valve seat surface. This inclined exposed surface at the line-pressure side is disposed substantially at right angles to the direction of the pressure against it, and consequently the pressure acts as a wedge between the inclined surface of the sealing material and the sealing ring forcing the tapered fin-like edge of the sealing material tightly against the valve seat, the knife-like thinness of the edge pressed tightly in engagement with the valve seat preventing the pressure from entering between the plastic material and the seating surface. This action is somewhat similar to the action of the cup-shaped hat gasket or leather as employed for instance in connection with a pump plunger or piston. While the plastic material is sufficiently pliable to flow through the spaces of the valve structure under pressure of the pressure gun, it is of such homogenerious consistency and of sufficient solidity and toughness that the fin-like sealing edge in engagement with the seating surface will not wash out under the effect of pressure or contact of the fluid flowing through the valve. At the same time the material provides a lubricating medium in engagement with the valve seat to permit the valve gate to be opened and closed with facility.

In Fig. 9 we have illustrated a modified form of the invention, in which the sealing rings 62 are formed of sheet metal of U-shape in cross-section, an annular tapered groove 63 being provided in the seating face, and which is in communication with the inner side by means of a series of spaced ports 64. The structure and operation is otherwise similar to the form of the invention shown in Figs. 1 to 8.

In Fig. 10 we have illustrated another modified form of the invention, in which a valve disc 65 is slidably engaged at its periphery within the circular opening 66 of the valve gate, as distinguished from the floating mounting of the disc 57 of the forms of the invention as illustrated in Figs. 1 to 8 and 9. This disc is provided centrally of its periphery with an annular groove 67 in communication with the stem passage 51, and at each of its faces is provided with a peripheral recess 68 for receiving a sealing ring 69. The recesses 68 are in communication with the channel 67 by means of a series of ports 70. The sealing rings are each provided in their seating face with an annular tapered groove 71, which is in communication with the recess of the disc by means of a series of ports 72, the plastic material flowing from the annular recess 67 through the ports 70 and 72 to the tapered groove 71.

In Fig. 11 we have illustrated another modified form of the invention, in which each of the side walls of the valve gate chamber of the valve body is provided with a sealing plate 73, having a circular opening 74 in register with the conduit passages. The valve gate and sealing rings illustrated in this embodiment are similar to the modification of the invention shown in Fig. 10, the sealing rings sealing upon the inwardly-disposed surfaces of the plates 73. It will be understood, however, that the valve gates and rings, as shown in the other embodiments, may be employed in this embodiment, if desired. At the outwardly-disposed side of each of the plates 73 there is provided in the conduit passage an annular recess 75 in which a sealing ring 76 is engaged, and within the valve body at each side there is provided an annular groove 77 outwardly spaced from the conduit and disposed so that the corner of the sealing ring 76, constituted by its outer face and its outer periphery, is disposed within this groove 77. The grooves 77 at each side of the valve are adapted to contain plastic material and to have this plastic material fed thereto under pressure by the pressure gun, and for this purpose the groove 77 at one side is connected by a passage 78 to the sealing recess 29 at the end of the valve stem, while the groove 77 at the other side is connected by a passage 79 to the annular stem-sealing space 37.

The cross-sectional shape of the grooves 77 is such that their inner wall is substantially at an obtuse angle to the surface of the ring 76, between the groove 77 and the conduit passage, so that the plastic material under pressure will be forced against the surface of the ring in the form of a tapered fin-like structure, in a similar manner to the disposition of the sealing material disposed in the grooves of the sealing rings, and consequently the line pressure which may flow in the space between the surface of the ring 76 and the valve body will be directed substantially at right angles to the exposed inclined surface of the sealing material, thus acting as a wedge to force the ring 76 into tight sealing engagement with the seating plate 74. The operation of the sealing rings of the valve gate is substantially similar to the operation of the sealing rings of the other forms of the invention.

We have illustrated and described preferred and satisfactory embodiments of the invention, but it will be understood that changes may be made therein, within the spirit and scope thereof, as defined in the appended claims.

Having thus described our invention, what we claim and desire to secure by Letters Patent is:

1. In a gate valve, a valve body having a conduit therethrough and a valve gate chamber disposed transversely of said conduit and having opposed parallel and imperforate seat surfaces surrounding said conduit, a valve gate movably disposed in said chamber to open and close said conduit, said gate having an opening therethrough, a closure disc carried in said opening and axially movable therein, a pair of spaced valve ring means carried by the periphery of said disc for relative axial movement at each side of said disc having annular sealing portions for engagement with said chamber seat surfaces in surrounding relation to said conduit, there being an annular space peripherally of said disc and between said valve ring means, and plastic material supply passage means extending to said annular space between said ring means.

2. In a gate valve, a valve body having a conduit therethrough and a valve gate chamber disposed transversely of said conduit and having opposed parallel and imperforate seat surfaces surrounding said conduit, a valve gate movably disposed in said chamber to open and close said conduit, said gate having an opening therethrough, a closure disc carried in said opening and axially movable therein, a pair of spaced valve ring means carried by the periphery of said disc for relative axial movement at each side of said disc having annular sealing portions for engagement with said chamber seat surfaces in surrounding relation to said conduit, there being an annular space peripherally of said disc and between said valve ring means, each said ring means having in its sealing portion a continuous annular plastic material receiving space and communication channel means extending from said space to the inner side of said valve ring means, and plastic material supply passage means extending to said annular space between said ring means.

3. In a gate valve, a valve body having a conduit therethrough and a valve gate chamber disposed transversely of said conduit and having opposed parallel and imperforate seat surfaces surrounding said conduit, a valve gate movably disposed in said chamber to open and close said conduit, said gate having an opening therethrough, a closure disc carried in said opening and axially movable therein, a pair of spaced valve ring means carried by the periphery of said disc for relative axial movement at each side of said disc having annular sealing portions for engagement with said chamber seat surfaces in surrounding relation to said conduit, there being an annular space peripherally of said disc and between said valve ring means, annular abutment means on the periphery of said disc engaged in said annular space between said valve ring means adapted to limit said axial movement, and plastic material supply passage means extending to said annular space between said ring means.

4. The combination in a gate valve, of a valve body having a conduit therethrough and a valve gate chamber disposed transversely of said conduit and having a seat surface surrounding said conduit, a valve gate movably disposed in said chamber to open and close said conduit, an annular sealing member carried by said gate having an annular sealing surface for engagement with said chamber seat surface in surrounding relation to said conduit, and having in its sealing portion a continuous annular plastic material receiving groove at least one side wall thereof being so shaped as to meet said sealing surface at an acute angle, and communication channel means extending from said groove to another side of said member, and plastic material supply passage means extending to said communication channel means.

5. The combination in a gate valve, of a valve body having a conduit therethrough and a valve gate chamber disposed transversely of said conduit and having a seat surface surrounding said conduit, a valve gate movably disposed in said chamber to open and close said conduit, an annular sealing surface for engagement with said chamber seat surface in surrounding relation to said conduit, and having in its sealing portion a continuous annular plastic material receiving groove having outwardly divergent side walls each so shaped as to meet said sealing surface at an acute angle, and communication channel means extending from said groove to another side of said member, and plastic material supply passage means extending to said communication channel means.

CHARLES E. STRECKER.
CHARLES J. KOPRIVA.